March 12, 1935.   F. A. SCHROEDER   1,993,948
ADJUSTABLE EARTH BORING TOOL
Filed Oct. 23, 1931   3 Sheets-Sheet 1
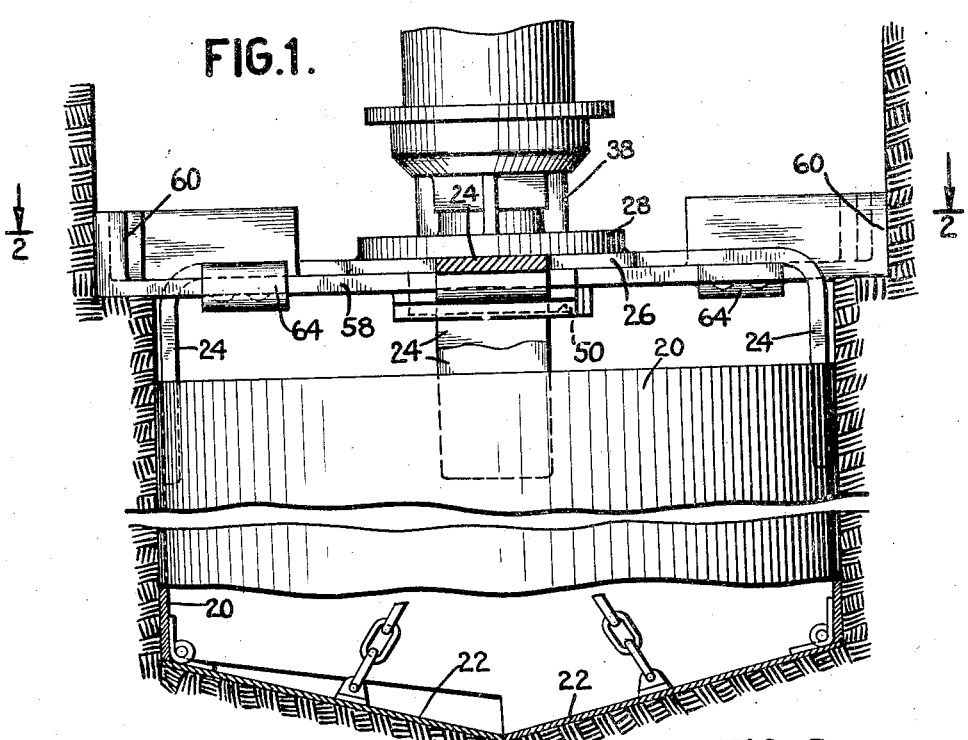
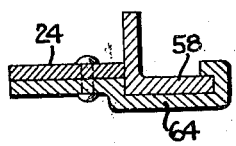
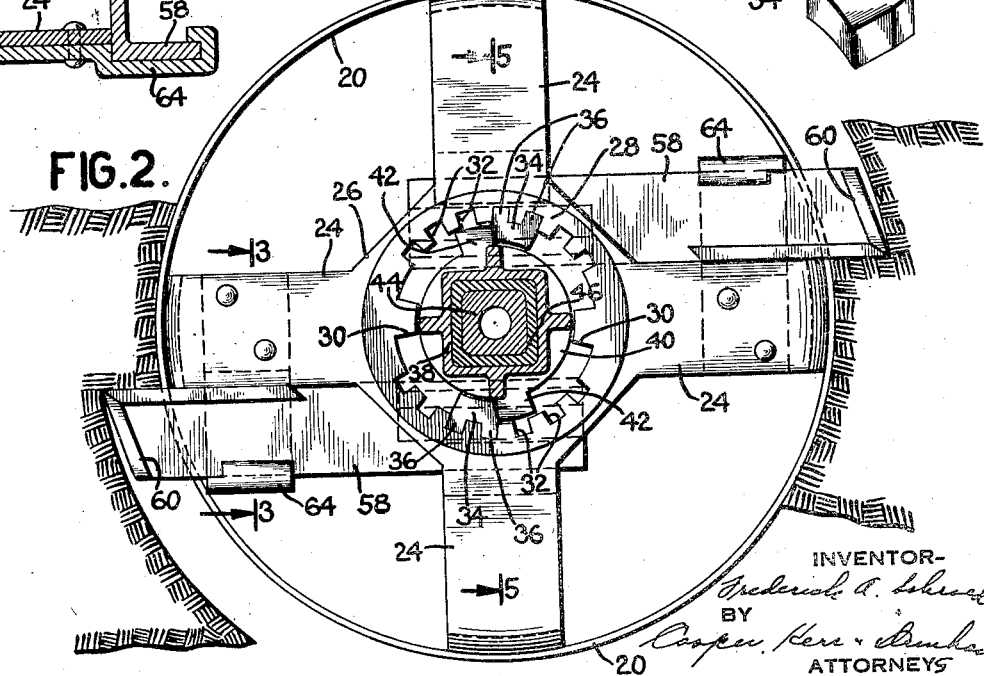

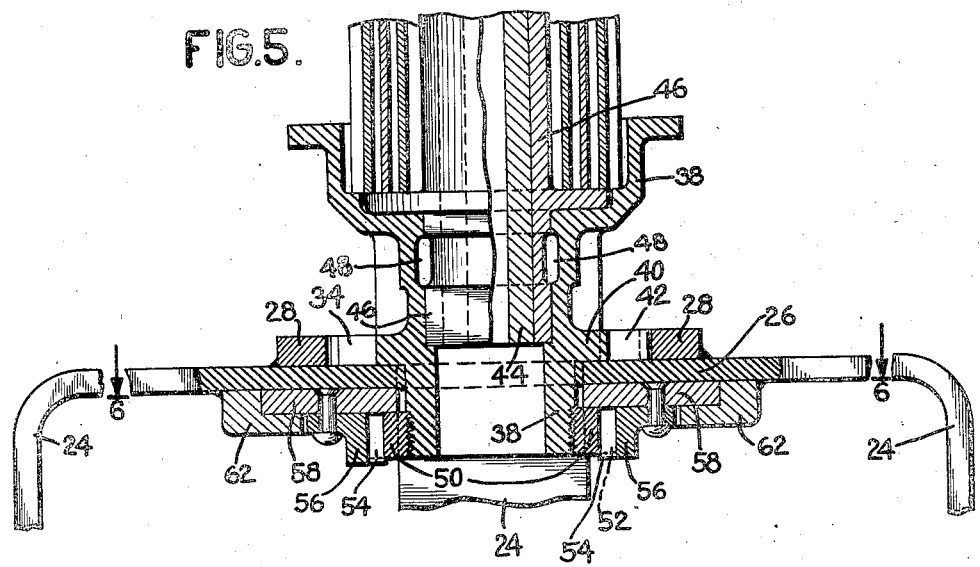
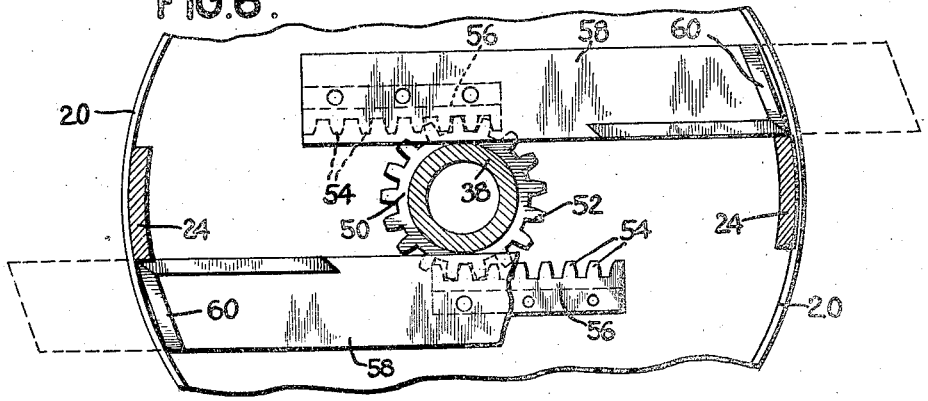
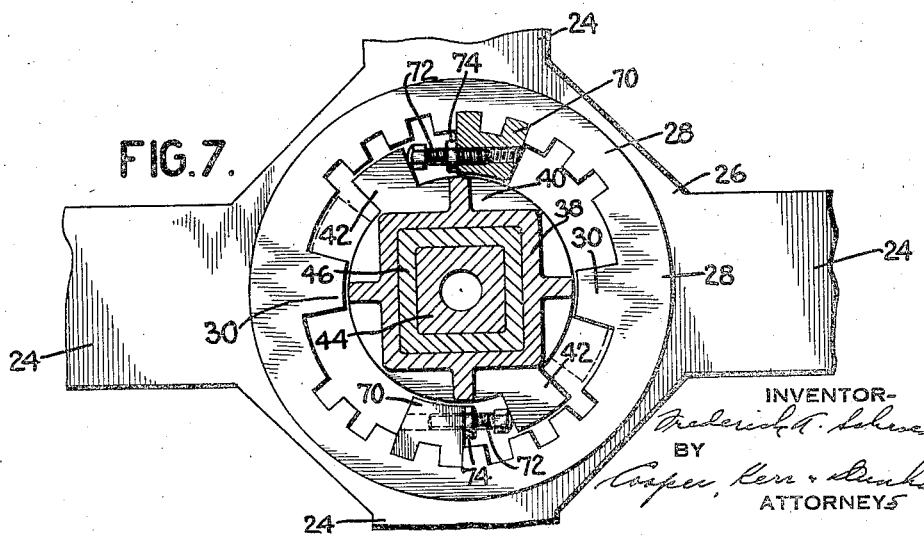

March 12, 1935.  F. A. SCHROEDER  1,993,948
ADJUSTABLE EARTH BORING TOOL
Filed Oct. 23, 1931  3 Sheets-Sheet 3
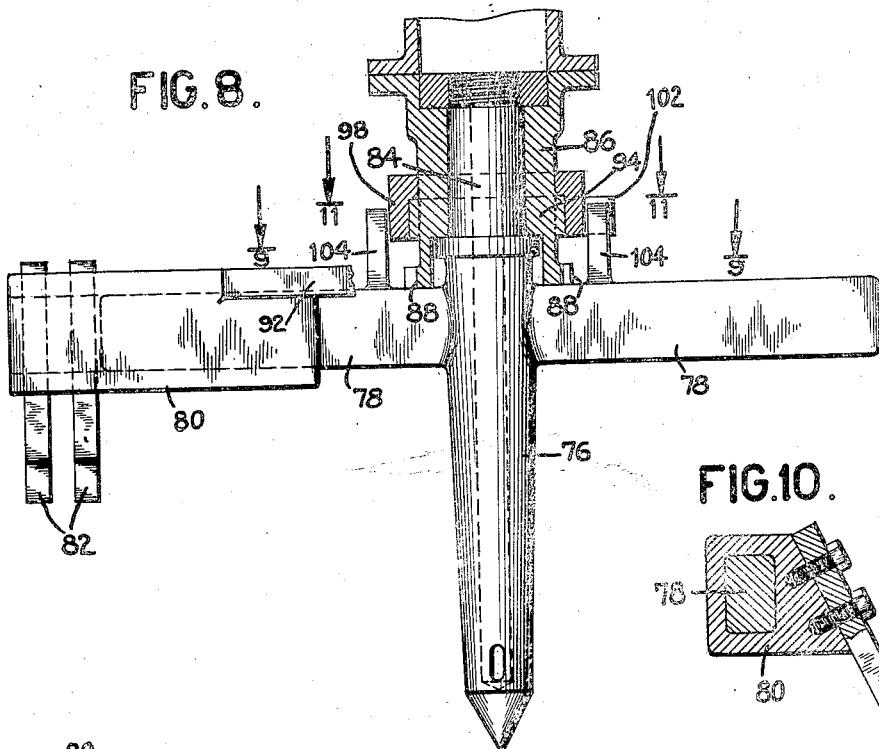
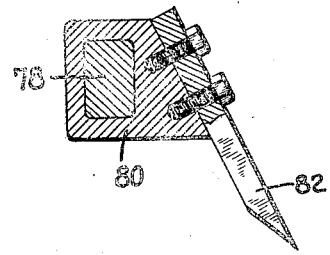
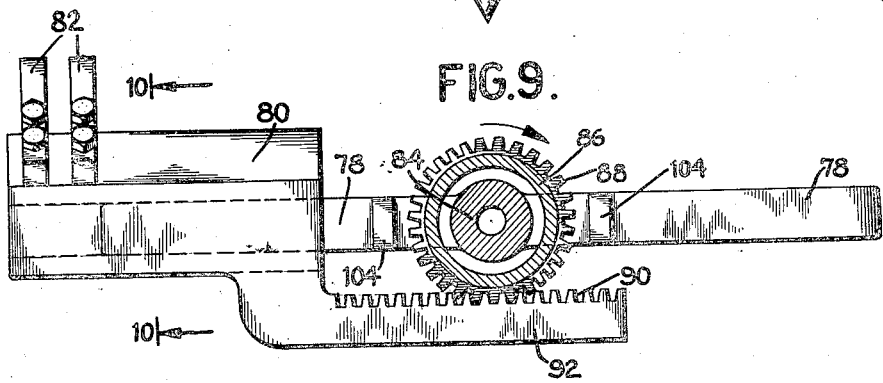
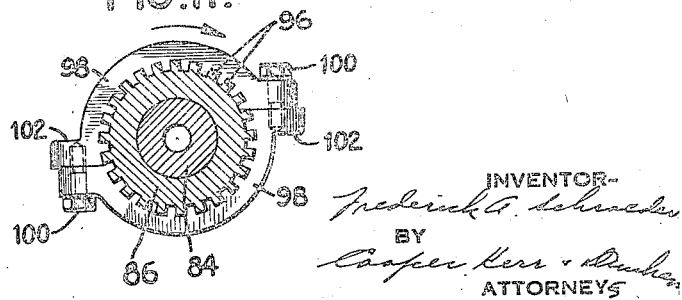

Patented Mar. 12, 1935

1,993,948

UNITED STATES PATENT OFFICE 1,993,948

ADJUSTABLE EARTH BORING TOOL

Frederick A. Schroeder, Rochelle Park, N. J., assignor to Raymond Concrete Pile Company, New York, N. Y., a corporation of New Jersey Application October 23, 1931, Serial No. 570,560

4 Claims. (Cl. 255—74)

An object of the present invention is to disclose improved apparatus for adjusting the operative diameters of earth boring tools such as rotary buckets, scarifiers, etc.

Another object is to provide means for automatically adjusting the operative diameter of a tool while the tool is in operative position in a hole in the ground.

Further and other objects and advantages will be apparent from the specification and claims, and from the accompanying drawings which illustrate what is now considered the preferred embodiment of the invention.

Fig. 1 is a side view of a rotary digging bucket having at its top a pair of cutters adjustable according to the present invention.

Fig. 2 is a cross section on line 2—2 of Fig. 1.

Fig. 3 is a detail cross-section on line 3—3 of Fig. 2.

Fig. 4 is an enlarged isometric view of one of the stop blocks.

Fig. 5 is a cross-section on line 5—5 of Fig. 2.

Fig. 6 is a cross-section on line 6—6 of Fig. 5.

Fig. 7 is an enlarged view of a modified detail of the central portion of Fig. 2 showing adjustable stop blocks.

Fig. 8 is a side view partly in section showing a modification of the invention as applied to a scarifier.

Fig. 9 is a cross-section on line 9—9 of Fig. 8.

Fig. 10 is a detail view on line 10—10 of Fig. 9.

Fig. 11 is a detail view on line 11—11 of Fig. 8.

Referring to Figs. 1-6, the rotary tool, which in this case is a digging bucket, comprises a shell 20, discharge gates 22, and bails 24 formed from a steel plate 26, the downwardly projecting parts of the bails being attached to the bucket shell 20.

Welded on the top of plate 26, concentrically with the bucket shell, is a circular ring 28 having a pair of oppositely disposed inwardly projecting stops 30, and having between the stops two sets of notches 32 cut in the inner rim of the ring. A pair of readily removable stops 34 (Figs. 2 and 4) are provided, each having a pair of projections 36 adapted to enter an adjacent pair of notches 32.

Projecting downwardly through the center of plate 26, and rotatable relatively thereto, is a drive hub 38 having a flange 40 resting on top of plate 26. Projecting radially beyond rim 40 are the oppositely disposed lugs 42. Hub 38 is therefore free to rotate within ring 28 through an arc limited at one end by contact of lugs 42 against stops 30, and at the other end by contact of lugs 42 against settable stops 34, assuming, of course, that stops 34 have been placed in diametrically opposite notches 32.

Hub 38 is rotatable from above by a telescopic kelly, the lower section of which is a square shaft 44 fitted into a hub 46 which enters the upper end of hub 38 and is locked thereto by keys 48.

Threaded on the lower end of hub 38, below plate 26 and spaced therefrom is a pinion 50 having teeth 52 in mesh with teeth 54 on parallel racks 56, one on each side of the pinion. Each rack 56 is riveted to a flat bar 58, on the outer end of which is a cutter 60. Cutter bars 58 are guided for reciprocatory motion by plate 26, pinion 50, and angle guides 62.

An additional guide member 64 serves to steady the cutter bars near their outer ends.

It is apparent (Fig. 6) that rotation of pinion 50 relative to the bucket will move the bars longitudinally simultaneously and thereby change the operative radii of the cutters. The parts above described are so assembled that when hub 38 (Fig. 2) is rotated counter-clockwise until lugs 42 contact with fixed stops 30, the cutters 60 are in retracted or home positions as shown in Fig. 6. While the cutters are in that position the bucket is lowered into the hole. Then when the drive kelly is rotated in its operative direction, clockwise, hub 38 turns relatively to the bucket until lugs 42 move into contact with stops 34. When that rotation takes place, pinion 50 moves the cutter bars 58 outwardly to place cutters 60 at the desired radii, the outward travel being limited by stops 34 which had previously been set by the operator at the surface of the ground. After contact is made by lugs 42 against settable stops 34 (Fig. 2) the bucket and cutters rotate, with cutters 60 enlarging the hole formed by the bucket, the detritus from the cutters falling into the bucket.

When it is desired to retract the cutters, the direction of rotation of hub 38 is reversed, whereupon lugs 42 will rotate into contact with stops 30, during which rotation, the cutters will be retracted to home positions.

If it be desired to provide a finer adjustment of the cutting positions of the cutters than is provided by notches 32, stop blocks 34 may be replaced by similar blocks 70 (Fig. 7) having adjusting screws 72 locked by nuts 74, the heads of the screws serving as stops for lugs 42.

Figs. 8-11 inclusive show a modified form of the invention as applied to a scarifying tool. The tool comprises a centering bit 76 having a cross bar 78 projecting radially from both sides thereof to slidably support cutter holders 80 to which are bolted the cutter teeth 82. Bit 76 is continued upwardly above bar 78 to form a hub 84, surrounding which, and adjustable circumferentially relatively thereto, is a drive hub 86, having at its lower end a pinion 88 in mesh with teeth 90 on bar 92 integral with cutter holder 80.

Above pinion 88 on hub 86 is a flange 94 in which are formed projecting teeth 96 (Fig. 11). Enclosing flange 94 is a collar 98 having notches therein adapted to accommodate teeth 96. For convenience of assembly, collar 98 is made in halves fastened together by bolts 100. The collar has two diametrically opposite shoulders 102.

Projecting upwardly from bar 78 are a pair of lugs 104 located in the path of shoulders 102 so that when hub 86 and collar 98 are rotated clockwise (Figs. 9 and 11) shoulders 102 will contact with lugs 104 and force bar 78 and its cutters to rotate in unison with the hub.

Drive collar 98 may be raised by the operator to clear flange 94 and may then be rotated and lowered again to operative position with shoulders 102 in any desired rotative position relatively to hub 86 and pinion 88, and since pinion 88 will rotate relatively to bar 78 until contact is made by shoulders 102 against lugs 104 and since during that relative rotation of the pinion, bar 92 and cutters 82 are moving outwardly on bars 78, it is clear that the circumferential position of collar 98 on hub 86 determines the operating radii of the cutters. Reversal of direction of rotation of hub 86 will in like manner retract the cutters until bolt heads 100 contact with lugs 104.

It is to be understood that the invention is not limited to the specific embodiment herein illustrated and described, but may be used in other ways without departure from its spirit as defined by the following claims.

I claim:

1. A rotary tool for boring a hole in the ground, a cutter operatively supported by said tool, means interconnecting said tool and said cutter and operable at the will of the operator while said tool is in the hole for either rotating said tool or for moving said cutter outwardly or inwardly relative to said tool, and a removable element settable by the operator before the tool is lowered into the hole for limiting said relative movement of the cutter.

2. A rotary digging bucket for boring a hole in the ground, a cutter supported by said digging bucket, rotatable means for rotating said bucket and said cutter in said hole, a pinion rotatable by said rotatable means, a rack interconnecting said pinion and said cutter whereby said rotatable means is effective at the will of the operator for moving said cutter outwardly or inwardly relative to said bucket, and means for limiting said movement of the cutter.

3. A tool for boring a hole in the ground having a digging bucket and a support for said bucket, a ring having a pair of lugs fixed to said support and having between said lugs sets of notches, a driving hub passing through said support and being supported for rotation with respect thereto, cutters mounted on said support for reciprocatory motion, means carried by said hub for moving said cutters relative to said bucket upon rotation of said hub, stops carried by the notches of said ring, means carried by said hub adapted to contact said lugs to rotate said support in one direction of rotation and being adapted to contact said stops to rotate said support in the other direction of rotation.

4. A tool for boring a hole in the ground having a digging bucket and a support for said bucket, a circular ring having a pair of oppositely disposed inwardly projecting integral stops fixed to said support and having between said stops two sets of notches, a driving hub having a flange with oppositely disposed lugs integral therewith, said hub passing centrally through said support and being supported thereon by said flange for rotation with respect thereto, a pinion fixed to said hub below said support and spaced therefrom, cutters each having a rack attached thereto adapted to mesh with said pinion, means on said support for guiding said cutters for reciprocatory motion outwardly or inwardly relative to said bucket upon rotation of said hub in either direction, removable stops having adjusting screws, and each of said stops having a pair of projections adapted to enter a pair of adjacent notches in said ring, the lugs on said flange being adapted to contact said integral stops to rotate said support in one direction of rotation and being adapted to contact said screws in said removable stops to rotate said support in the other direction of rotation.

FREDERICK A. SCHROEDER.